United States Patent
Maruta et al.

(10) Patent No.: US 6,724,493 B1
(45) Date of Patent: Apr. 20, 2004

(54) INFORMATION PROCESSING APPARATUS, INFORMATION PROCESSING METHOD, IMAGE OUTPUT SYSTEM, ELECTRIC POWER CONSUMPTION CONTROL METHOD FOR IMAGE OUTPUT SYSTEM, AND STORAGE MEDIUM THEREFOR

(75) Inventors: Hidekazu Maruta, Ohta-ku (JP); Tsunao Hombo, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/511,681

(22) Filed: Feb. 23, 2000

(30) Foreign Application Priority Data

Feb. 25, 1999 (JP) .............................. 11-048155

(51) Int. Cl.[7] .......................... G06F 3/12; G06F 15/00; G06F 13/00; G06K 15/02
(52) U.S. Cl. ...................... 358/1.14; 358/1.15; 399/43; 399/70; 713/300; 713/310; 713/320; 713/330; 713/340; 709/223; 709/226; 709/227
(58) Field of Search ................. 358/1.14, 1.15; 399/43, 70; 713/300–340; 709/223, 226, 227

(56) References Cited

U.S. PATENT DOCUMENTS

| | | | | |
|---|---|---|---|---|
| 5,940,186 A | * | 8/1999 | Barry et al. ................ 358/296 |
| 6,348,971 B2 | * | 2/2002 | Owa et al. ................. 358/1.15 |
| 2002/0089694 A1 | * | 7/2002 | Idehara ..................... 358/1.15 |
| 2003/0053112 A1 | * | 3/2003 | Motosugi et al. ......... 358/1.14 |
| 2003/0191975 A1 | * | 10/2003 | Kohara ....................... 713/300 |

* cited by examiner

Primary Examiner—Edward Coles
Assistant Examiner—Iraj Rahimi
(74) Attorney, Agent, or Firm—Rossi & Associates

(57) ABSTRACT

The states of plural image output apparatuses are sensed. Then, an image output apparatus, which will supply image data, is selected according to a size of an image output job on the basis of image data and the states of the image output apparatuses in such a manner as to reduce an electric power consumption required for outputting images.

24 Claims, 10 Drawing Sheets

INFORMATION PROCESSING APPARATUS, INFORMATION PROCESSING METHOD, IMAGE OUTPUT SYSTEM, ELECTRIC POWER CONSUMPTION CONTROL METHOD FOR IMAGE OUTPUT SYSTEM, AND STORAGE MEDIUM THEREFOR

BACKGROUND OF THE INVENTION

1. Field of the Invention

The present invention relates to an information processing apparatus, and an information processing method. Further, the present invention relates to an image output system having a plurality of image output apparatuses such as a digital copying machine and a laser printer connected to a network, a method of controlling an electric power consumption of the image output system, and a storage medium therefor.

2. Description of Related Art

Conventionally, a conventional image output apparatus such as, for example, a digital copying machine, a laser beam printer (LBP), a facsimile apparatus is connected to a network, and a personal computer that is connected to the network transmits documents and image data to the image output apparatus to print out them.

A conventional image output apparatus as mentioned above is generally constructed such that if the image output apparatus is not operated for a predetermined period of time by operating a control panel, etc., the supply of electric power to a fixing device or the like requiring a large power is stopped in order to shift to an energy-saving mode (power consumption-saving mode) for suppressing the electric power consumption in the entire apparatus.

In a conventional image output system having a plurality of image output apparatuses connected to a network as a unit, however, the conditions for shifting to a power-saving mode depend on each apparatus, and this makes it difficult to control the entire electric power consumption in the image output apparatuses connected to the network.

For example, if two printers are connected to many personal computers with one printer being activated or operated and the other being in the energy-saving mode, the printer in the energy saving mode is normally operated if another personal computer outputs an image output signal.

If the printout is not urgent, it is possible to wait for a current print job of the activated one printer to be finished and then have the printer produce a next output. Particularly if a thermal roller fixing device with a large thermal capacity is used, the conventional way of output control, in which the fixing device in the energy-saving mode at a low temperature is heated repeatedly, needs to be improved in view of saving energy.

Accordingly, the present invention relates to an information processing apparatus, an information processing method, an image output system, a method of controlling the electric power consumption thereof and a storage medium therefor, which make it possible to properly control the electric power consumption in a plurality of image output apparatuses connected to a network.

SUMMARY OF THE INVENTION

It an object of the present invention to provide an information processing apparatus, an information processing method, an image output system, and an electric power consumption controlling method for the image output system, which are capable of reducing the electric power consumption required for outputting images.

To attain the above object, the present invention provides an information processing apparatus comprising receiving means for receiving image data, sensing means for sensing a state of a plurality of image output apparatuses, and selecting means for selecting from the plurality of image output apparatuses an image output apparatus that is to output the image data received by the receiving means according to the state of the plurality of image output apparatuses sensed by the sensing means such that an electric power consumption for outputting images can be minimum.

Preferably, the selecting means selects the image output apparatus according to a size of a job based on the image data received by the receiving means and the state of the plurality of image output apparatuses sensed by the sensing means.

More preferably, the selecting means selects the image output apparatus that has a suitable electric power consumption for the size of the job.

To attain the above object, the present invention provides an information processing method comprising a receiving step of receiving image data, a sensing step of sensing a state of a plurality of image output apparatuses, a selecting step of selecting from the plurality of image output apparatuses an image output apparatus that is to output the image data received in the receiving step according to the state of the plurality of image output apparatuses sensed in the sensing step such that an electric power consumption for outputting images can be minimum.

To attain the above object, the present invention provides a storage medium which stores a program for controlling an image processing apparatus to receive image data and selectively supply the received image data to one of a plurality of image output apparatuses, wherein the program includes a receiving module for receiving the image data, a sensing module for sensing a state of the plurality of image output apparatuses, and a selecting module for selecting from the plurality of image output apparatuses an image output apparatus that is to output the image data received by the receiving module according to the state of the plurality of image output apparatuses sensed by the sensing module such that an electric power consumption for outputting images can be minimum.

To attain the above object, the present invention provides an image output system in which a plurality of image output apparatuses are connected to an information processing apparatus, wherein the information processing apparatus comprises state sensing means for sensing a state of the plurality of image output apparatuses, and wherein the image output system controls operation of the plurality of image output apparatuses in such a manner as to reduce an electric power consumption of the image output system as a whole according to the sensed state of the image output apparatuses.

Preferably, the image output system further comprises an image processing apparatus for transmitting image data to the information processing apparatus, and wherein the information processing apparatus has selecting means for selecting from the plurality of image output apparatuses an image output apparatus that is to output the image data transmitted by the image processing apparatus according to a size of a job based on the image data and the state of the plurality of image output apparatuses sensed by the state sensing means such that an electric power consumption for outputting images can be minimum.

More preferably, the selecting means selects the image output apparatus that has a suitable electric power consumption for the size of the job based on the image data transmitted by the image processing apparatus, and wherein the image output system activates the selected image output apparatus into a standby state when it is determined that the selected image output apparatus is not in the standby state, according to the state thereof sensed by the state sensing means.

Also preferably, the selecting means selects the image output apparatus that has a suitable electric power consumption for the size of the job based on the image data transmitted by the image processing apparatus, and wherein the image output system switches the selected image output system to another image output system when it is determined that the selected image output apparatus cannot be used, according to the state thereof sensed by the state sensing means.

Preferably, the information processing apparatus is capable of selecting and setting an electric power consumption value of each of the plurality of image output apparatuses per unit time during a waiting period from a plurality of values.

Also preferably, the information processing apparatus is capable of selecting and setting a temperature of each of the plurality of image output apparatuses to which a temperature of a heating member of the image output apparatus is to be controlled, from a plurality of values.

In a preferred form of the image output system, the state sensing means senses the state of the image output apparatus selected according to the size of the job.

Alternatively, the state sensing means senses the state of the plurality of image output apparatuses in predetermined timing.

Further, the state sensing means may sense the state of the plurality of image output apparatuses in various manners, for example, it may sense the state of each image output apparatus, based on at least one of an atmospheric temperature thereof, a temperature of the heating member thereof, elapsed time from a completion of a last job of the image output apparatus, and how much or whether energy is saved for the heating member.

Alternatively, the selecting means selects the image output apparatus designated by a user in preference.

To attain the above object, the present invention provides a method of controlling an electric power consumption of an image output system, which transmits image data from an image processing apparatus to an information processing apparatus, and outputs the transmitted image data from one of plural image output apparatuses connected to the information processing apparatus, the method comprising the steps of selecting from the plurality of image output apparatuses an image output apparatus that has a suitable electric power consumption for a size of a job based on the image data transmitted from the image processing apparatus, sensing a state of the selected image output apparatus, and activating the selected image output apparatus into a standby state when it is determined that the selected image output apparatus is not in the standby state, according to the sensed state of the selected image output apparatus, and switching the selected image output apparatus to another image output apparatus when it is determined that the selected image output apparatus cannot be used, according to the sensed state of the selected image output apparatus.

To attain the above object, the present invention provides a storage medium which stores a program for transmitting image data from an image processing apparatus to an information processing apparatus, and causing the transmitted image data to be outputted from one of a plurality of image output apparatuses connected to the information processing apparatus, the program being executed by a CPU in the information processing apparatus, wherein the program comprises a module for selecting from the plurality of image output apparatuses an image output apparatus that has a suitable electric power consumption suitable for a size of of a job based on the image data transmitted from the image processing apparatus, a module for sensing a state of the selected image output apparatus, and a module for activating the selected image output apparatus into a standby state when it is determined that the selected image output apparatus is not in the standby state, according to the sensed state of the selected image output apparatus, and switching the selected image output apparatus to another image output apparatus when it is determined that the selected image output apparatus cannot be used, according to the sensed state of the selected image output apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Figure 1:
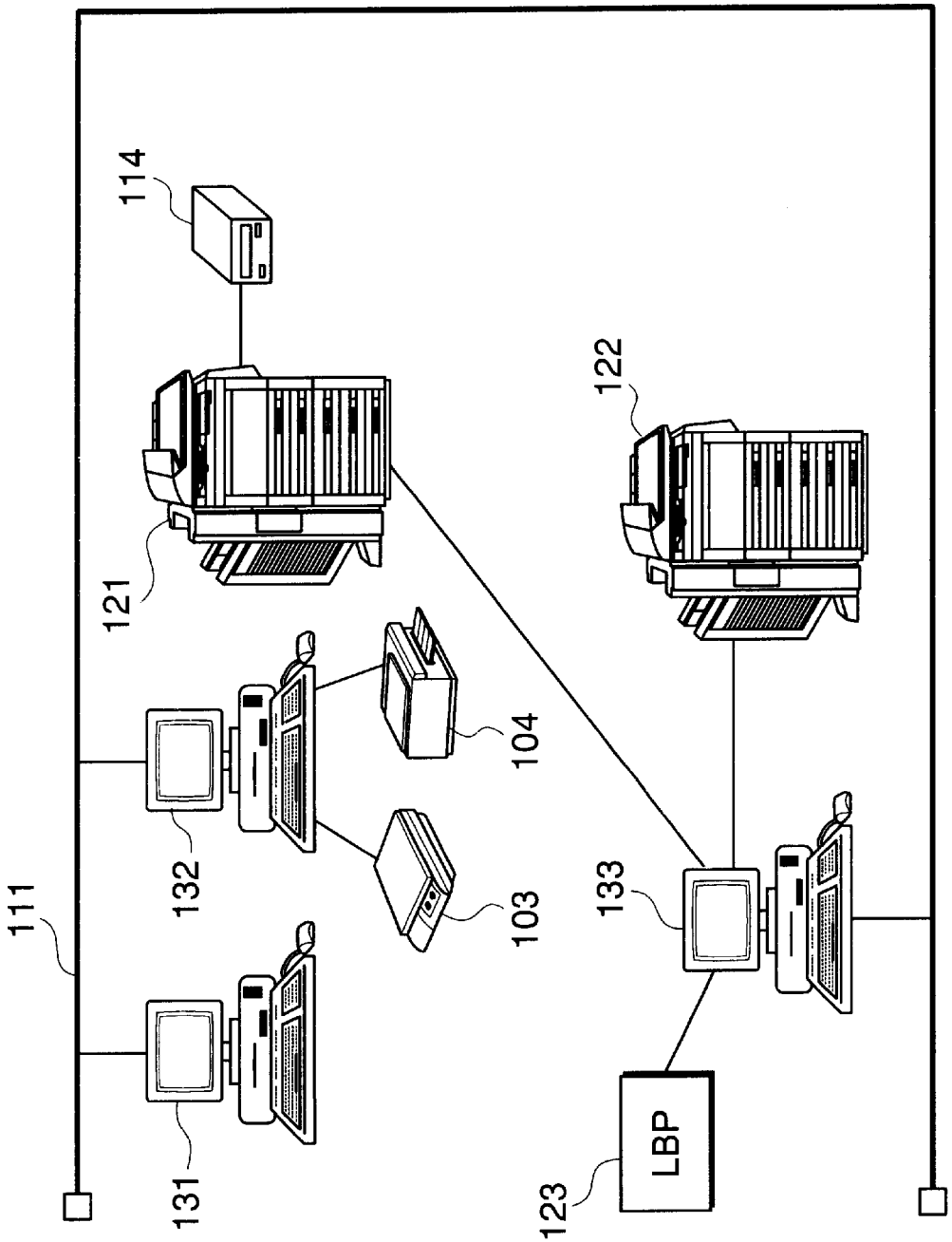
FIG. 1 is a block diagram showing the entire structure of an image output system according to a preferred embodiment of the present invention.

The present invention will be described in further detail with reference to the accompanying drawings showing a preferred embodiment thereof. FIG. 1 is a block diagram showing the entire structure of the image output system according to a preferred embodiment of the present invention.

In FIG. 1, reference numeral 111 denotes a network (LAN) connected to computers 131, 132, 133. The computer 131 is normally used by a user, and it produces documents and exchanges electronic mails with other computers connected to the network 111. The computer 132 has the same functions as the computer 131, and connects to a scanner unit 103 and a printer unit 104 through an attached general purpose interface. The scanner unit 103 reads an image by scanning a manuscript, and is used to attach the read image to the document produced by the computer 132. The printer unit 104 is used to print the image produced by the computer 132 on recording paper.

A computer system that is constituted by the computer 132, the scanner unit 103 and the printer unit 104 has a simplified copying function of printing the image read by the scanner unit 103 with the printer unit 104 by operating the computer 132.

The computer 133 acts as a printer server connected to the LAN 111, and the computer (printer server) 133 has connected thereto a plurality of image output apparatuses such as electrophotographic digital copying machines 121, 122 and an electrophotographic laser beam printer (LBP) 123. The printer server 133 receives image data produced by the computers 131, 132, and selects an image output apparatus for printing out the image data according to the received image data. Then, the printer server 133 transfers the image data to the selected image output apparatus. The selection will be described later in further detail.

The digital copying machine 121 has a large liquid crystal display touch panel for setting the copying conditions, a scanner for scanning a manuscript and reading images, and a printer for printing the images on recording paper according to the image data. The digital copying machine 121 has a function of copying the manuscript read by the scanner on the printer, and an electronic filing function of storing the manuscript read by the scanner by connecting to a magneto-optical disk unit 114.

The digital copying machine 121 also has a function of printing the image data transmitted from the printer server 133. For example, the digital copying machine 121 receives the image produced by the computer 131 as command data for forming images through the LAN 111 and the printer server 133. Then, the digital copying machine 121 develops images included in the command data into a bit map of image data and prints it. The digital copying machine 122 has the same copying and printing functions as the digital copying machine 121.

The digital copying machine 121 produces a large number of printouts per unit time, and consumes a large amount of electricity per unit time for the printout compared with the digital copying machine 122. The laser beam printer 123 produces the smallest number of printouts per unit time and consumes the smallest amount of electricity per unit time.

The number of printouts and the amount of consumed electricity are expressed as V1>V2>V3 and P1>P2>P3 where the numbers of printouts produced by the digital copying machine 121, the digital copying machine 122 and the laser beam printer 123 are regarded as V1, V2 and V3, respectively, and the amounts of electricity consumed by the digital copying machine 121, the digital copying machine 122 and the laser beam printer 123, are regarded as P1, P2 and P3, respectively.

The digital copying machines 121, 122 and the laser beam printer 123 have a function of selecting an electricity consumption value per unit time during waiting period from a plurality of values, and the selectable values are individually set by the connected printer server 133.

It is therefore possible to determine whether the digital copying machines 121, 122 and the laser printer 123 should be in a standby mode in which a number of pieces of electrical equipment consume electric power or in a sleep mode in which little electric power is consumed, in response to an instruction from the printer server 133.

Thus, it is possible to control the electric power consumption suitably for the operational environment of the apparatuses. For example, all the apparatuses are set in the standby mode during working hours, and at night, only the laser printer 123 is set in the standby mode whereas the digital copying machines 121, 122 are in the sleep mode.

Figure 2:
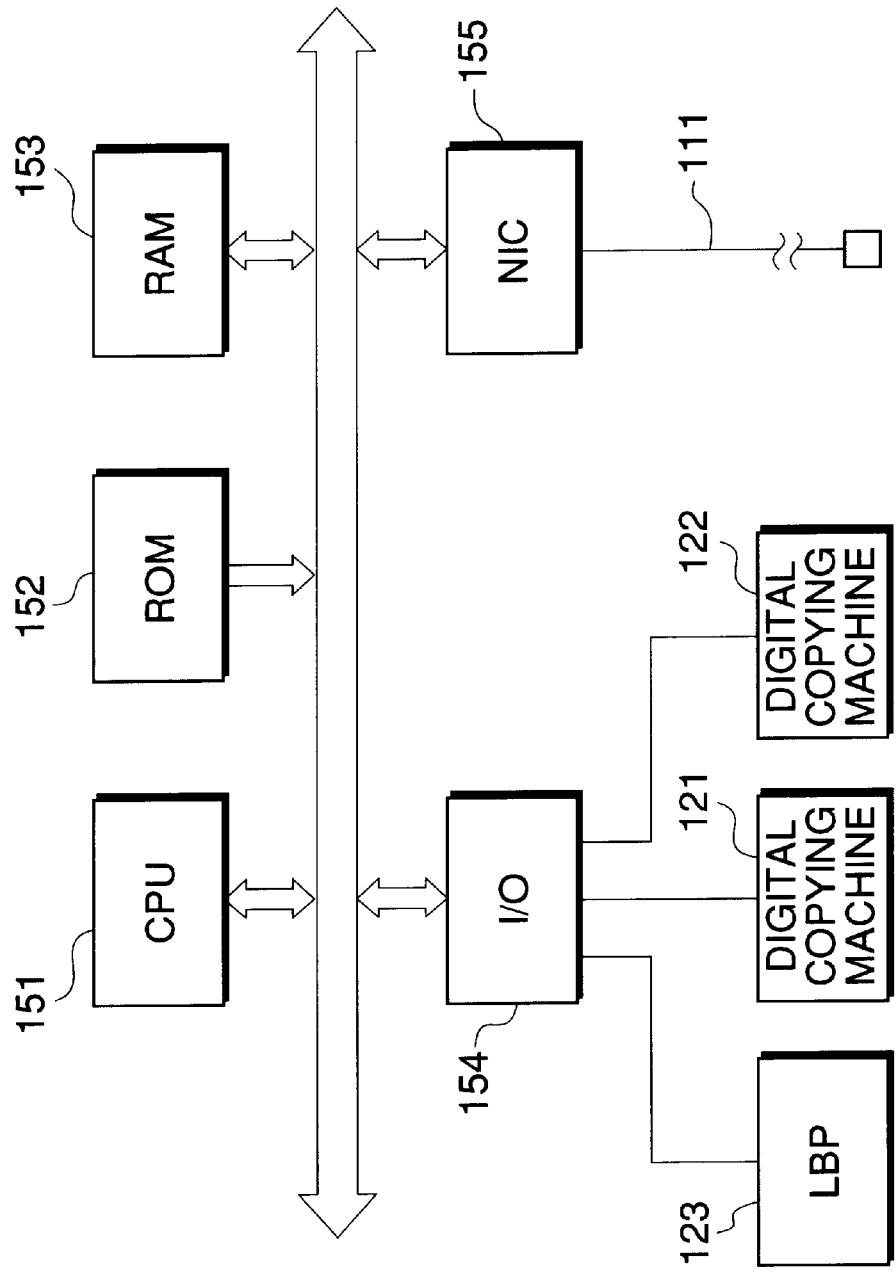
FIG. 2 is a block diagram showing the structure of a printer server.

FIG. 2 is a block diagram showing the structure of the printer server 133. The printer server 133 is comprised mainly of an I/O interface 154 and a network interface card (NIC) 155 in addition to known CPU 151, ROM 152 and RAM 153. The I/O interface 154 connects to the laser beam printer 123 and the digital copying machines 121, 122. The NIC 155 connects to the network (LAN) 111.

Through the I/O interface 154, the printer server 133 recognizes whether the image output apparatuses, in other words, the digital copying machines 121, 122 and the laser beam printer 123 are on a standby, printing data or sleeping. The printer server 133 supplies image data received from the LAN 111 through the NIC 155 to the image output apparatus selected in the later-described procedure through the I/O interface 154.

Figure 3:
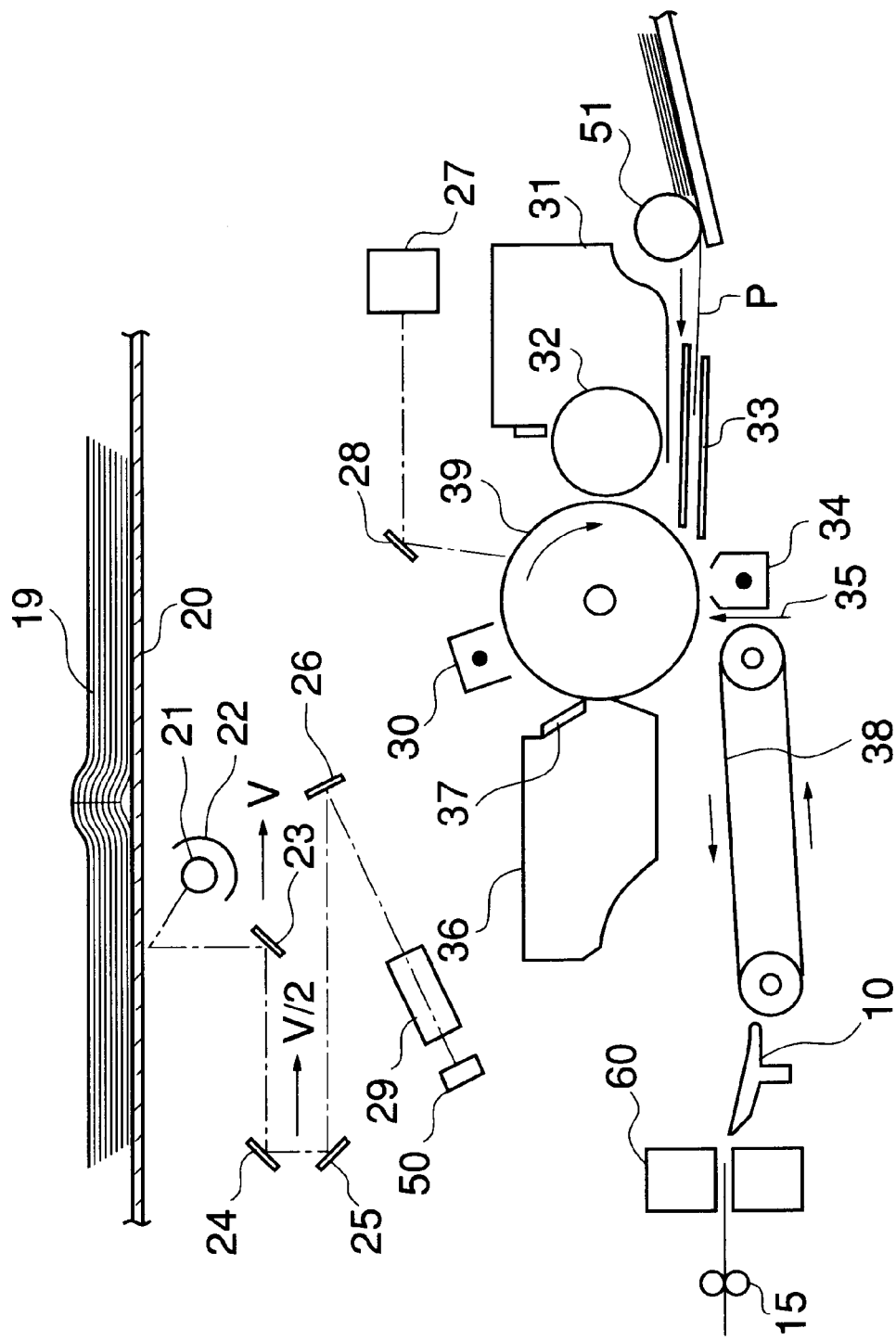
FIG. 3 is a view schematically showing the inner structure of a digital copying machine.

A description will now be given of the structure of the digital copying machines 121, 122. FIG. 3 shows the inner structure of the electrrophotographic digital copying machines 121, 122. In FIG. 3, reference numeral 20 denotes a manuscript glass. A manuscript 19 is placed on the manuscript glass 20, and predetermined copying conditions are set by operating a liquid crystal touch panel (not illustrated). Then, a copying start key provided at a control part (not illustrated) is pressed to rotate a photosensitive drum 39 in a clockwise direction indicated by an arrow in FIG. 3 at a peripheral velocity, and an image formation is started.

First, a light source 21 moves together with a reflection cover 22 and a first mirror 23 from a home position at a left side of the manuscript glass 20 toward a right side of the manuscript glass 20 at a predetermined velocity V. A second mirror 24 and a third mirror 25 are moved at a velocity of V/2 in the same direction, so that an image-formed lower surface of the manuscript 19 placed on the manuscript glass 20 can be illuminated and scanned from left side to the right side.

A reflected light from the surface of the manuscript 19 is then reflected on the first mirror 23, the second mirror 24 and the third mirror 25. Then, the reflected light is reflected on a fixed fourth mirror 26, and is formed on the surface of a CCD 50 through an image formation lens 29.

The CCD 50 outputs an image signal in a level corresponding to the quantity of inputted light, and a processing circuit (not illustrated) processes the image signal in a predetermined manner to form image data.

In the copying action, the image data is inputted to a laser driver (not illustrated). A laser 27 outputs a modulated laser light according to the image data, and the laser light enters a photosensitive drum 39 through a polygon mirror 28 to thereby expose the photosensitive drum 39.

An electrostatic latent image of a pattern corresponding to a manuscript image is sequentially formed on the surface of the photosensitive drum 39, which has been uniformly electrified to a predetermined positive or negative potential by a primary electrizer 30 before the exposure. With the rotation of the photosensitive drum 39 in a direction indicated by an arrow, the electrostatic latent images are transported to an area facing a developing roller 32 of a developing device 31.

Then, a predetermined developing bias is applied to an area between the developing roller 32 which is rotating while holding a toner (not illustrated) contained in the developing apparatus 31 and the photosensitive drum 39. Therefore, the toner on the developing roller 32 transfers to the electrostatic latent electric image on the photosensitive drum 39, and the electrostatic latent image is visualized as a toner image.

On the other hand, a paper feeding roller 51 feeds a recording material P, which is guided into a transfer part between the photosensitive drum 39 and a transfer electrizer 34 through a guide 33 in predetermined timing. Then, the transfer part adds a transfer corona to the recording material P, which hence comes into contact with the photosensitive drum 39 so that toner visual images on the surface of the photosensitive drum 39 are sequentially transferred onto the surface of the recording material P.

The back electric charges of the recording material P having passed through the transfer part are removed from an electricity removal needle 35, and at the same time, the recording material P is gradually separated from the surface of the photosensitive drum 39. The recording material P is introduced into the fixing device 60 through a transport part 38 and an entrance guide 10, and the toner image is fixed on the recording material P, as described later. Then, the recording material P with the image thus formed thereon is discharged to the outside of the digital copying machine.

A cleaning blade 37 of a cleaner 36 removes blots such as residual toner from the surface of the photosensitive drum 39 after the transfer so that images can repeatedly be formed on the surface of the photosensitive drum 39. When the moving optical members 21–25 having moved forward to expose the manuscript has reached a predetermined end point of the first half, they start to move backward. The movable optical members 21–25 return to respective initial home positions to wait for a next copy cycle to start.

Printing is performed in accordance with the image data supplied from the printer server 133 in the following manner. The image data supplied by the printer server 133 is developed into a bit map of image data by an image developing part (not illustrated) provided in the digital copying machine 121, and is inputted into the laser driver. Consequently, the laser 27 outputs a laser beam modulated in accordance with the image data. The laser beam forms images in the electrophotographic process as is the case with the copying described above.

The laser printer 123 has the same structure as that of the above described printing function using the electrophotographic process of the digital copying machine 121, and the laser printer 123 forms images in accordance with the image data supplied from the printer server 133.

Figure 4:
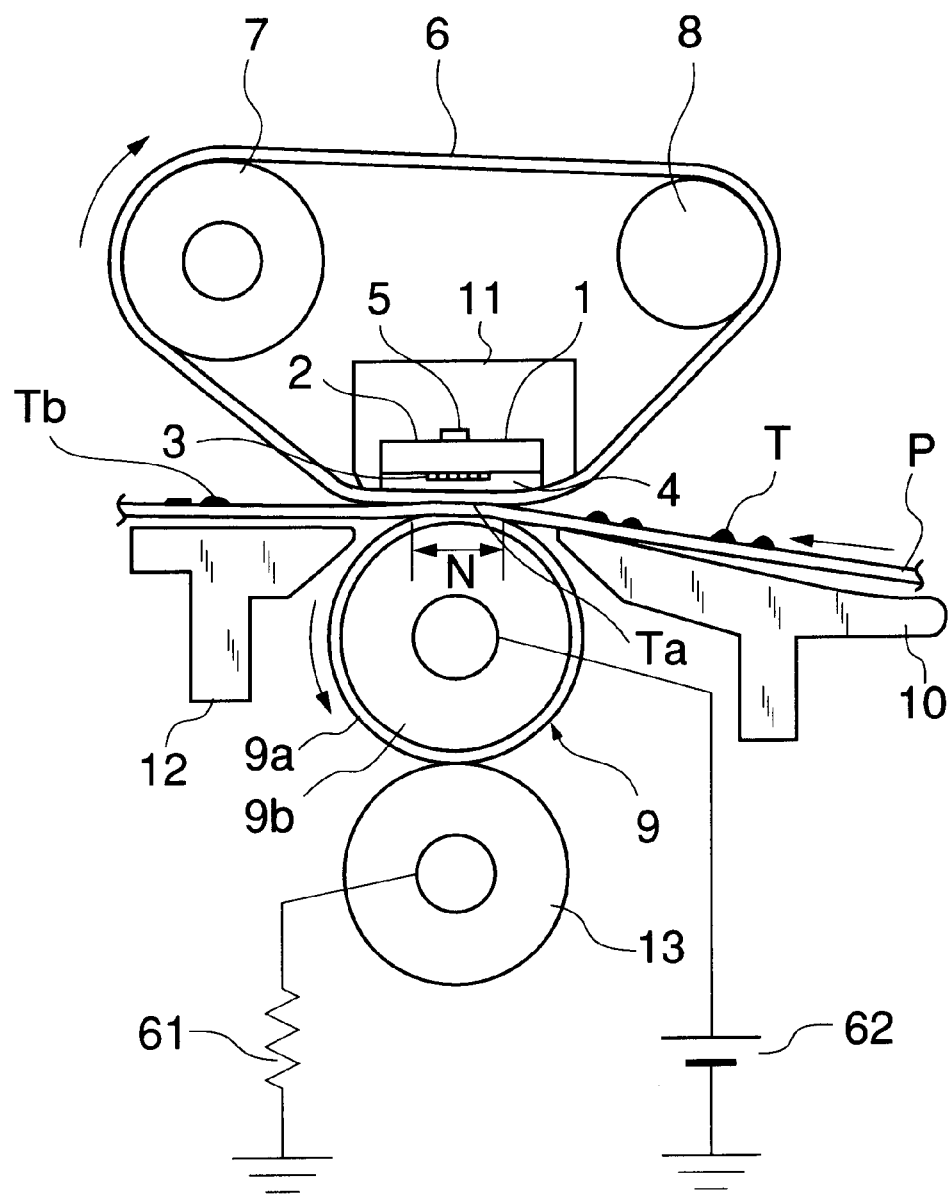
FIG. 4 is a view showing the structure of a fixing device using a fixing film.

FIG. 4 shows a first structure applicable as the fixing device 60 of the digital copying machines 121, 122 and the laser beam printer 123. In FIG. 4, reference numeral 6 denotes a fixing film in the form of an endless belt as a film member constituting a heating part. The fixing film 6 is extended between a left-side drive roller 7, a right-side following roller 8, and a low thermal capacity linear heater 1 as a heating body provided below the rollers 7, 8.

The fixing film 6 in the form of the endless belt has excellent heat resistance, mold releasability and durability so that it can be used repeatedly to heat and fix the toner image. The thickness of the fixing film is ordinarily 100 μm or less, and more preferably 40 μm or less.

For example, it is possible to use an endless belt of fixing film with a thickness of 30 μm, in which a mold releasing layer with a thickness of 10 μm made of a low surface energy resin such as PTEF (tetrafluoroethylene resin) and PFA (tetrafluoroethylene perfluoroalkylvinylether copolymer resin) with or without a conducting material such as carbon black is coated on the outer peripheral surface of a thin endless belt with a thickness of 20 μm made of a high heat resistant resin such as polyimide, polyetherimide, polyethersulfone and polyetherketone, or a metal such as nickel and SUS.

The low thermal capacity heater 1 as the heating body, which constitutes the heating part with the fixing film 6, is constructed in such a manner that a heating layer 3 is formed by coating a resisting material with a thickness of 10 μm and a width of 1.0 mm such as silver palladium and ruthenium oxide on an alumina substrate 2 with a thickness of 1.0 mm, a width of 10 mm and a longitudinal length of 340 mm, for example, and that a protective layer 4 with a thickness of 10 μm such as glass is formed on the heating layer 3 so that the fixing film 6 can smoothly slide thereon. The heater 1 is attached to and supported on a heater support 11.

The heater support 11 has a high insulating property as well high resistance and rigidity in order to insulate and support the heater 1 in the fixing device 60 and the image output apparatus. For example, the heater support 11 is made of a high resistant resin such as PPS (polyphenylenesulfide), PEEK (polyetheretherketone) and a liquid crystal polymer, or a composite material of the resin, ceramics and metal.

An alternating current of 100 V is carried through the heating layer 3 of the heater 1 from both ends in the longitudinal direction. An NTC (negative temperature coefficient) thermistor 5 is provided on the reverse surface of the substrate 2, by adhesion using a heat conductive silicon rubber adhesive, pressure-welding or integral formation. The current carrying is controlled by a control part (not illustrated) according to the sensed temperature from the thermistor 5.

The following roller 8 is also used as a tension roller for applying a tension in a direction to stretch the fixing film 6 to the outside. With the clockwise rotation of the drive roller 7 coated with silicon rubber or the like to achieve a high friction coefficient, the tensioned fixing film 6 is driven in the clockwise direction at a predetermined peripheral velocity without being wrinkled, meandered or delayed.

Reference numeral 9 denotes a pressurizing roller which is 380 mm long in the longitudinal direction and 25 mm long in diameter. The surface of the pressurizing roller 9 is coated with an insulating tube 9a formed of fluororesin such as PFA or the like with excellent mold releasability and durability. The inside of the pressurizing roller 9 is composed of a conductive rubber layer 9b as a conductive member.

The pressurizing roller 9 pinches the lower surface of the fixing film 6 in the form of the endless belt between the pressurizing roller 9 and the heater 1, and urges the lower surface of the fixing film 6 against the lower side of the heater 1 with an elastic force of, for example, between 5 kgf and 10 kgf, while rotating counterclockwise in the transport direction of the recording material P. The inside of the pressurizing roller 9 is connected to a bias 62. A roller 13 is rotated by the pressurizing roller 9, and the inside of the roller 13 is grounded through a resistance 61.

In the fixing device having the first structure as described above, in the above-mentioned image formation operation, the recording material (heated material) P, on the upper surface of which an unfixed toner image (a developing agent image) T is transferred, is guided by the guide 10. When the recording material P enters an area between the heater 1 and a pressure-urging part (hereinafter referred to as a fixing nip part) N of the pressurizing roller 9 formed through the fixing film 6, the unfixed toner image T passes through the area in a state of being in close contact with the lower surface of the fixing film 6 without being displaced, wrinkled or biased while the unfixed toner image T on the fixing film 6 receives the nipping pressure from the fixing nip part N.

When a toner image holding surface of the recording material P receives the heat from the heating layer 3 through the fixing film 6 while passing through the fixing nip part N in a fixed state of being pressed against the surface of the fixing film 6, the toner image T is melted at a high temperature and is softened and adhered as an image Ta to the surface of the recording material P.

The recording material P having passed through the fixing nip part N is guided by a guide 12 and is cooled, and the softened and adhered image Ta is fixed as an image Tb on the toner image holding surface of the recording material P.

In the fixing device having the first structure in FIG. 4, the heat capacitance of the heating layer 3 and substrate 2 of the heater 1 has a small heat capacitance, and the heater support 11 insulates and supports the heating layer 3 and the substrate 2. Thus, the surface temperature of the heater 1 in the fixing nip part N rises to a substantially high temperature with respect to the fusing point of the toner within a short period of time. This eliminates the necessity for a so-called standby temperature control, in other words, rising the temperature of the heater 1 in advance, so that the energy can be saved, and moreover a rise in the temperature inside the image output system can be prevented. Since the heating layer 3 and the substrate 2 have the low heat capacitance, the heat is decreased as paper passes through the fixing nip part N. For this reason, there is a limitation to a high-speed printing in which a large number of sheets pass through the fixing nip part N per unit time.

In the fixing device having the first structure, the thin fixing film is used, but a thermal roller may be used instead.

Figure 5:
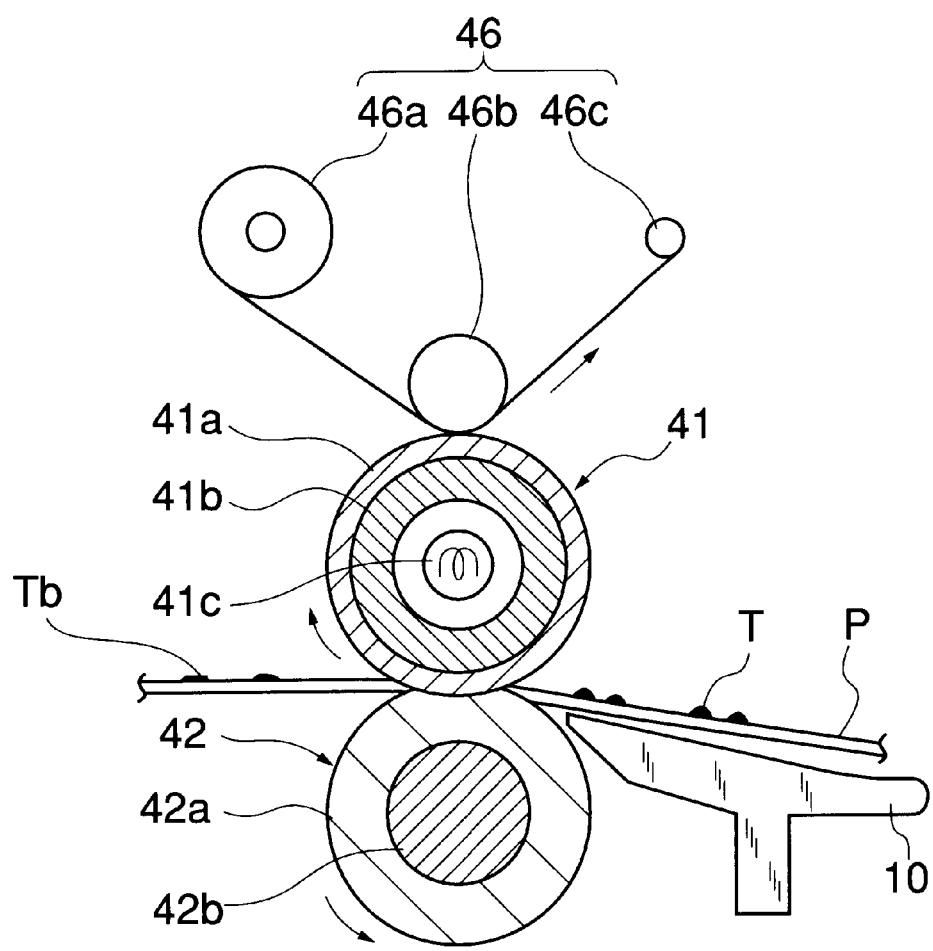
FIG. 5 is a view showing the structure of a fixing device using a thermal roller.

FIG. 5 shows a second structure of the fixing device 60 of the digital copying machine 121, 122 and the laser beam printer 123. In other words, FIG. 5 shows the structure of the fixing device having a thermal roller. A fixing roller 41 provided in the fixing device is comprised of a hollow cylindrical core 41b, and a halogen lamp 41c contained in the core 41b. A mold releasing layer 41a made of fluororesin for preventing the occurrence of an offset phenomenon is formed on the outer peripheral surface of the core 41b.

A pressurizing roller 42 is disposed in pressure contact with the fixing roller 41. The pressurizing roller 42 forms a nip part for nipping and transporting a transfer material in cooperation with the fixing roller 41. The pressurizing roller 42 has a cylindrical core 42b, whose outer peripheral surface is covered with an elastic body 42a such as rubber.

A cleaning part 46 is comprised of a cleaning member 46a in the form of a cloth wound in a roll, a web roller 46b and a winding roller 46c. The recording material P, on the upper surface of which the unfixed toner image T is transferred, is transported in a state of being nipped between the roller 41, which is rotated counterclockwise and heated, and the roller 42 which is rotated clockwise. At the same time, the recording material P is heated and fixed.

The fixing device with the second structure has a relatively high heat capacitance, and hence has a small amount of temperature decrease when the recording material passes through the fixing device. For this reason, the fixing device is suitable for copying a large amount of sheets. If the fixing device is used for copying a small number of sheets, however, the energy cannot be saved.

In order to start the copying or printing after a short waiting period in response to a copying or printing command, the temperature of the fixing roller 41 must be maintained at a high temperature enough for fixing or at a temperature, from which may be reached the high temperature enough for fixing if the fixing roller 41 is slightly heated, even when the image output apparatus is not operating. The temperature control of the fixing roller 41 while the apparatus is not operating will be called "standby temperature control". The temperature of the roller and the electric power consumption in the standby temperature control depend on the copying speed, the materials of the toner and the rollers, and so forth. For example, the electric power consumption is between 200 W and 700 W in order to maintain the temperature of the roller at 200° C. In order to save the energy in the entire system by using this fixing device with the second structure, therefore, the state of the fixing device must be sensed to determine whether it is possible to use the fixing device or not.

A description will now be given of the operation for producing a print by one of plural image output apparatuses, in other words, the digital copying machines 121, 122 and the laser beam printer 123 connected to the printer server 133 in accordance with the image data outputted from the computer 131 or 132 connected to the LAN 111. In the following description, each image output apparatus has the fixing device with the second structure using the thermal roller as shown in FIG. 5.

Figure 6:
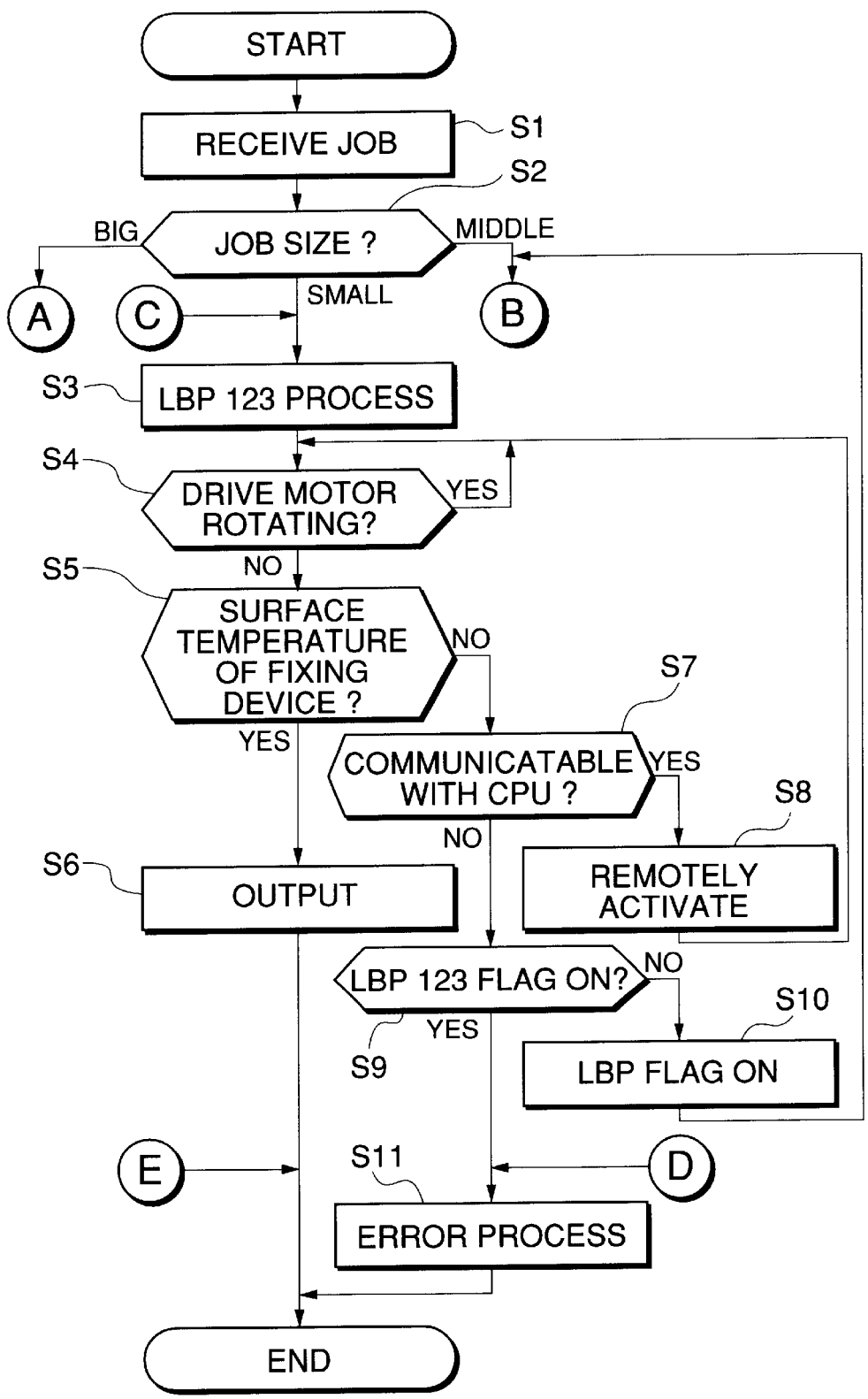
FIG. 6 is a flow chart showing a procedure for selecting where to output data from the image output system.
Figure 7:
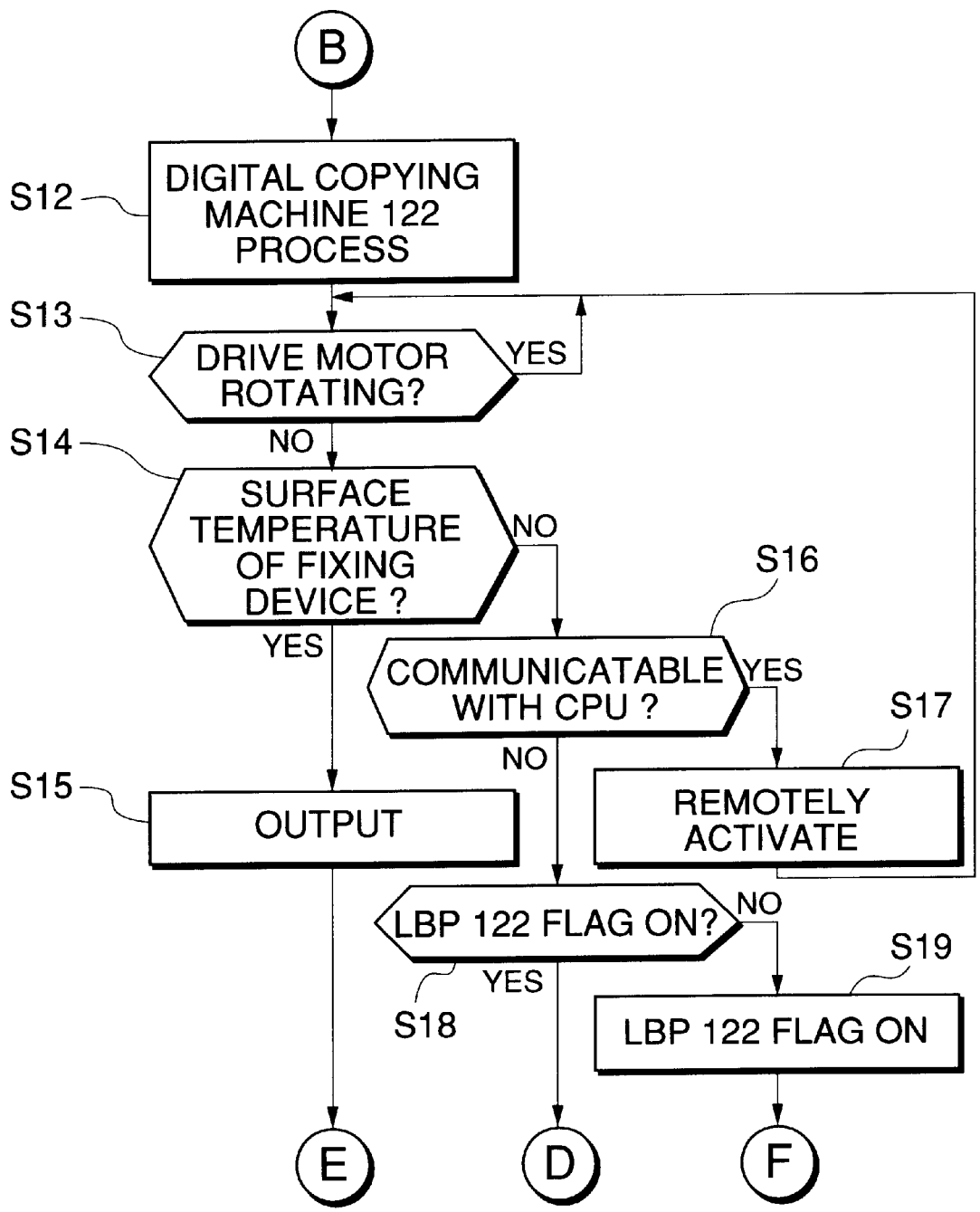
FIG. 7 is a flow chart showing a continued part of the procedure of FIG. 6.
Figure 8:
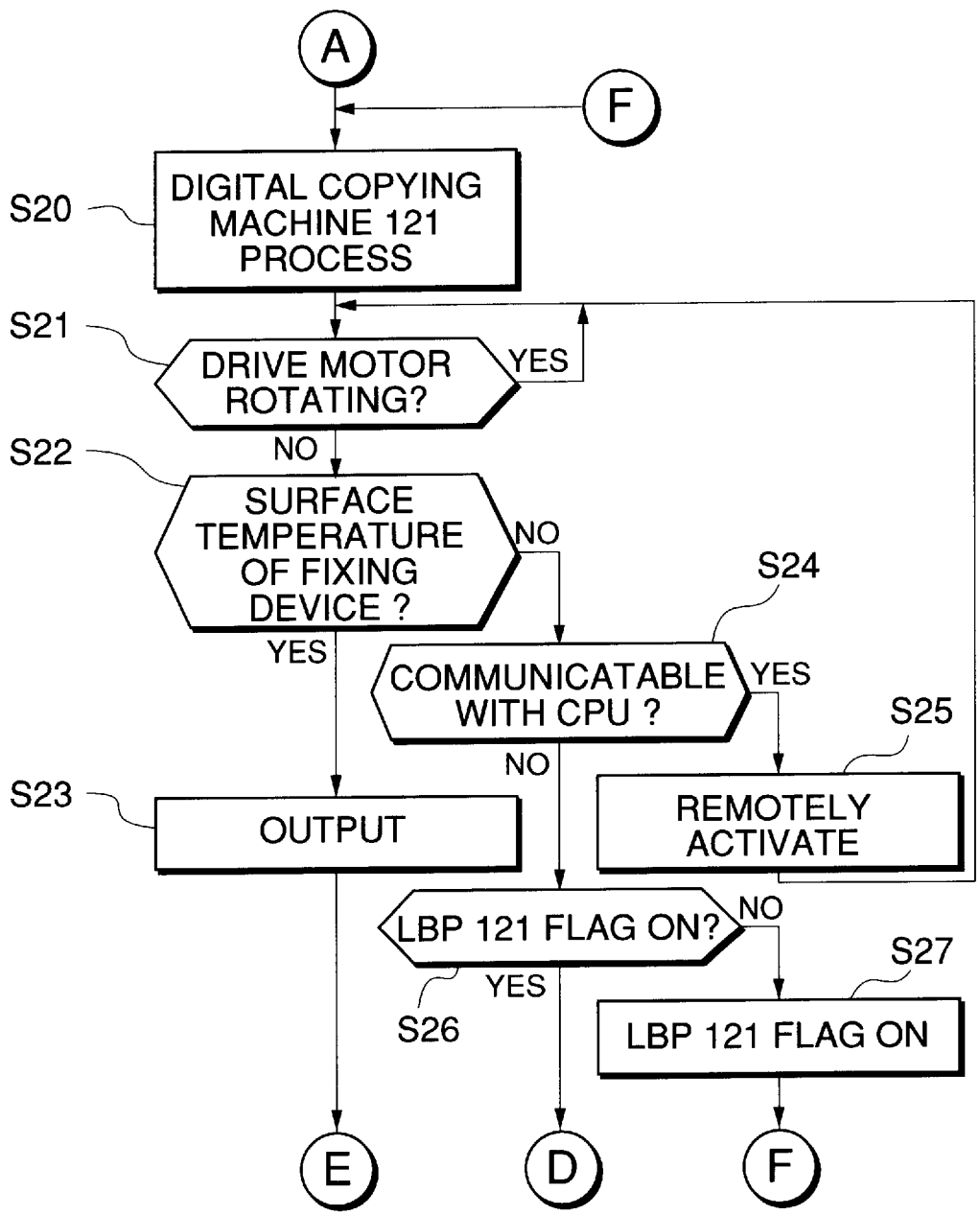
FIG. 8 is a flow chart showing a further continued part of the procedure of FIG. 6.

FIGS. 6, 7 and 8 are flow charts showing a procedure for selecting a destination of output data from the image output system. A program for the selection is stored in the ROM 152 in the computer (printer server) 133, and is executed by the CPU 151. First, the computer 131 or 132 connected to the LAN 111 transmits a job to the printer server 133. The job relates to a type of an output image, and the number of printouts to be produced or the like.

On receipt of the job (step S1), the printer server 133 determines a size of the job (the number of printouts) and selects an image output apparatus according to the size of the job (step S2). For example, the printer server 133 selects different image output apparatuses for 10 printouts or less, 50 printouts or less, and 50 printouts or more, respectively. Instead of selecting the image output apparatus according to the size of the job, the printer server 133 may select the image output apparatus according to other parameters effecting the number of printouts per unit time, e.g., a type of the image (color or black-and-white) and a form of output (size, both sides, reduction).

For example, if the received job indicates 10 printouts or less, the printer server 133 selects the laser beam printer (LBP) 123, which produces a small number of printouts per unit time but consumes a small electric power, as the image output apparatus. Then, the printer server 133 prepares for the printing using the laser beam printer 123 (step S3). Then, the printer server 133 detects whether the laser beam printer 123 is on standby or not (steps S4 and S5). This is determined by sensing the surface temperature of the fixing roller 41 or the rotation of a drive motor for rotating the fixing roller 41.

The detection of standby state based on the surface temperature of the fixing roller 41 is carried out in the following manner. Normally, an output of a temperature sensing device, e.g., a thermistor arranged on the surface of the fixing roller 41 or in proximity to the fixing roller 41 is used in order to adjust the temperature of the fixing roller 41. According to the output of the thermistor, a controller (not illustrated) of the laser beam printer 123 determines whether the surface temperature of the fixing roller 41 is equal to a predetermined temperature required for fixing the toner, and sends a temperature signal indicating that the surface temperature of the fixing roller 41 is equal to the predetermined temperature, to the printer server 133 through the I/O interface 154.

The detection of standby state based on the rotation of the drive motor is carried out in the following manner. For example, in the case of the drive motor that controls the rotation in such a manner as to rotate the fixing roller 41 when the temperature of the fixing roller 41 is increased from a low temperature to a predetermined temperature and stops the rotation of the fixing roller 41 when the fixing roller 41 reaches the predetermined temperature, a controller (not illustrated) of the laser beam printer 133 detects whether the drive motor is stopped or not and sends a rotation signal indicating that the drive motor is rotating, to the printer server 133 through the I/O interface 154.

Whether the drive motor is rotating or not is determined according to whether the rotation signal is inputted from the laser beam printer 123 (step S4). If the drive motor is rotating, the printer server 133 determines that the temperature of the fixing roller 41 is on the increase, and repeats the step S4. On the other hand, if it is determined that the drive motor is not rotating since the rotation signal is not inputted from the laser beam printer 123, it is determined whether the surface temperature of the fixing roller 41 is equal to a predetermined temperature (suitable for fixing the toner) according to whether the temperature signal is inputted from the laser beam printer 123 (step S5). If the drive motor is not rotating and the surface temperature of the fixing roller 41 is equal to the predetermined temperature, the printer server 133 determines that the laser beam printer 123 is on standby, instructs the laser beam printer 123 to start the printout, and supplies the image data received through the LAN 111 to the laser beam printer 123 (step S6). Accordingly, the laser beam printer 123 executes the printout.

If the temperature signal indicating that the surface temperature of the fixing roller 41 is equal to the predetermined temperature is not inputted in the step S5, it is determined whether it is possible to communicate with the controller in the laser beam printer 123 (step S7). If it is possible to communicate with the controller in the laser beam printer 123, the laser beam printer 123 is in a so-called "sleep mode", in which the electric power is saved. Therefore, the printer server 133 remotely activates the laser beam printer 123 (step S8), and cancels the sleep mode of the laser beam printer 123. The printer server 133 instructs the laser beam printer 123 to start the printout when the laser beam printer 123 is brought into the standby state.

On the other hand, if it is determined in the step S7 that it is impossible to communicate with the controller in the laser beam printer 123, the printer server 133 determines that a main power supply of the laser beam printer 123 is turned off. Then, the printer server 133 determines whether a flag indicating that it is impossible to use the laser beam printer 123 due to the shut-off of the main power supply or the like is on or not (step S9). If the flag is not on, the flag is turned on (step S10), and the process goes to a step for detecting the state of another printer.

Which printer will be detected is determined according to the processing capacity of the printer and the job size. Since 10 printouts or less are produced in this case, the state of the digital copying machine (printer) 122 with the largest processing capacity next to the laser beam printer 12 is detected according to a flow chart of FIG. 7, and the above-mentioned processing is executed (steps S12–S19). If it is impossible to use the digital copying machine 122, the flag is turned on in the step S19, and the process goes to a step for detecting the state of the other digital copying machine 121. The above-mentioned processing is executed according to a flow chart of FIG. 8 (steps S20–S27).

If the size of the received job is small as mentioned above, the states of the laser beam printer 123, the digital copying machine 122 and the digital copying machine 121 are detected in that order from the one which produces the smallest number of printouts per unit time and consumes the smallest electric power.

If the flag is on in the step S9, in other words, if the laser beam printer 123 is selected although it was already determined that it is impossible to use the laser beam printer 123 and the selection of the laser beam printer 123 is switched to the selection of another printer, an error process is carried out (step S11), in which it is determined that it is impossible to use all the printers that may be controlled by the printer server 133 due to the shut-off of the main power supply or the like, and then an error message is returned to the job transmitting part. An example of the error message is "there is no printer that can be used. Please check a printer power supply and a cable connection."

As is clear from the steps S4 and S5, if the rotation of the drive motor is sensed even when the surface temperature of the fixing roller 41 is equal to the predetermined temperature, it is determined that the laser beam printer 123 has already started processing another job. When the processing of the other job is completed and the laser beam printer 123 is brought into the standby state, the printer server 133 instructs the laser beam printer 123 to start the printout.

After the job is processed, the printer server 144 transmits the output results to the job transmitting part through the LAN 111. The output results relates to the state of the name of a printer that has executed the printout, the state of other printers, the time of execution, and so forth if the printout has been executed. If the printout has not been executed, an error message indicating that the printout cannot be executed is transmitted to the job transmitting part through the LAN 111.

As stated above, the image output system of the present embodiment can select the image output apparatus with a suitable consumption electric power for the size of the job received by the printer server 133, and more specifically, the laser beam printer 123, the digital copying machine 121 and the digital copying machine 122 in that order.

FIGS. 6–9 show the control procedure in the case where the thermal roller is used as the fixing device of the digital copying machines 121, 122 and the laser beam printer 123 as the image output apparatuses. A description will now be given of the control procedure in the case where the first structure in which the fixing film is used as the fixing device of the image output apparatus as shown in FIG. 4 is adopted.

Figure 9:
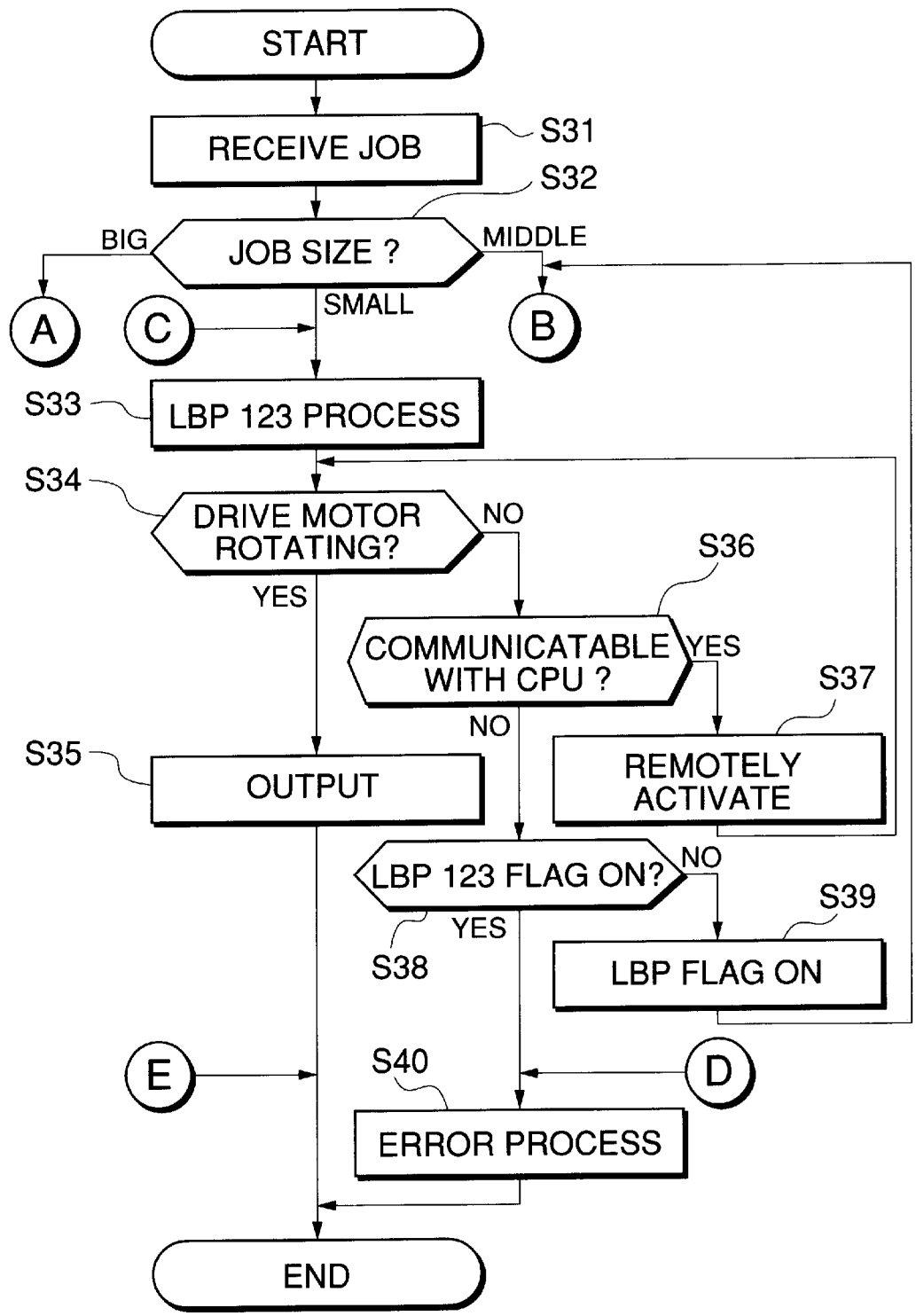
FIG. 9 is a flow chart showing another procedure for selecting where to output data from an image output system.

FIG. 9 is a flow chart showing the control procedure in the case where the fixing film is used as the fixing device of the laser beam printer 123. The control procedure in FIG. 9 is used instead of the control procedure in FIG. 6. In the control procedure in FIG. 9, whether the laser beam printer 123 is on standby or not is determined in a different manner from the control procedure in FIG. 6 in the case where the thermal roller is used as the fixing device.

Even if the fixing film is used as the fixing device of the digital copying machine 121 or 122, the procedure in FIG. 9 may be applied.

In the case of the fixing device using the fixing film described with reference to FIG. 4, the temperature is increased to a desired temperature required for fixing within a short period of time as stated above. When the printer server 133 instructs the laser beam printer 123 to start, the printing can be started immediately without the necessity of performing the standby temperature control required for the fixing device using the thermal roller. If the rotation of the fixing film is stopped, the fixing film may be broken since it is locally overheated by the heat of the heater. When the printing is possible, therefore, the fixing film must be kept rotating. Thus, the image output apparatus having the fixing device using the fixing film determines that the printer 123 is on standby if the fixing film is rotating, in other words, if the drive motor for rotating the fixing film is rotating. Therefore, the printer server 133 determines that the laser beam printer 123 is on standby if it receives a rotation signal indicating that the drive motor is rotating from the laser beam printer 123 through the I/O interface 154.

A description will now be given of the control procedure in FIG. 9.

FIG. 9 is a flow chart showing the procedure for the printer server 133 to determine where to output the image data from the image output system. A processing program therefor is stored in the ROM 152 in the computer (printer server) 133 and is executed by the CPU 151. First, a job is transmitted from the computer 131 or 132 connected to the LAN 111 to the printer server 133. The job to be transmitted relates to a type of an output image, and the number of printouts to be produced, or the like.

When the printer server 133 receives the job (step S31), it identifies a size of the job (the number of prints), and selects an image output apparatus according to the size of the job (step S32). For example, the printer server 133 selects different image output apparatuses for 10 printouts or less, 50 printouts or less, and 50 printouts or more, respectively. Instead of selecting the image output apparatus according to the size of the job, the printer server 133 may select the image output apparatus according to other parameters effecting the number of printouts per unit time, e.g., a type of the image (color or black-and-white) and a form of output (size, both sides, reduction).

For example, if the received job indicates 10 printouts or less, the printer server 133 selects the laser beam printer (LBP) 123, which produces a small number of prints per unit time but consumes a small electric power, as the image output apparatus. Then, the printer server 133 prepares for the printing using the laser beam printer 123 (step S33). Then, the printer server 133 detects whether the laser beam printer 123 is on standby or not. This is determined by sensing the rotation of a drive motor for rotating the fixing film (step S34).

More specifically, the printer server 133 determines whether the drive motor is rotating or not according to whether it receives a rotation signal indicating that the drive motor is rotating from the laser beam printer 123 through the I/O interface 154 (S34). If the drive motor is rotating, the printer server 133 determines that the laser beam printer 123 is on standby. Then, the printer server 133 instructs the laser beam printer 123 to start the printout and supplies the image data received through the LAN 111 to the laser beam printer 123 (step S35). Consequently, the laser beam printer 123 executes the printout.

If the printer server 133 does not receive the rotation signal indicating that the drive motor is rotating in the step S34, it determines whether it is possible to communicate with the controller in the laser beam printer 123 (step S36). If it is possible to communicate with the controller in the laser beam printer 123, the laser beam printer 123 is in the so-called "sleep mode" in which the electric power is saved. Accordingly, the printer server 133 remotely activates the laser beam printer 123 (step S37), and cancels the sleep mode of the laser beam printer 123. The printer server 133 instructs the laser beam printer 123 to start the printout when the laser beam printer 123 is brought into the standby state.

On the other hand, if it is determined in the step S7 that it is impossible to communicate with the controller in the laser beam printer 123, the printer server 133 determines that the main power supply of the laser beam printer 123 is turned off. Then, the printer server 133 determines whether the flag indicating that it is impossible to use the laser beam printer 123 due to the shut-off of the main power supply or the like is on or not (step S38). If the flag is not on, the flag is turned on (step S39), and the process goes to a step for detecting the state of another printer.

Which printer will be detected is determined according to the processing capacity of the printer and the job size. Since 10 printouts or less are produced in this case, the state of the digital copying machine (printer) 122 with the second largest processing capacity next to the laser beam printer 123 is detected according to the flow chart of FIG. 7, and the above-mentioned processing is executed (steps S12–S19). If it is impossible to use the digital copying machine 122, the flag is turned on in the step S19, and the process goes to a step for detecting the state of the other digital copying machine 121. The above-mentioned processing is executed according to the flow chart of FIG. 8 (steps S20–S27).

As stated above, if the size of the received job is small as mentioned above, the states of the laser beam printer 123, the digital copying machine 122 and the digital copying machine 121 are detected in that order from the one which produces the smallest number of printouts per unit time and consumes the smallest electric power.

If the flag is on in the step S38, an error process is carried out (step S40). An error message is returned to the job transmitting part in order to indicate that all the printers that may be controlled by the printer server 133 cannot be used due to the shut-off of the main power supply or the like.

In the above described embodiment, if the printer selected according to the job size is not waiting (on standby), the printing is started after the printer is remotely activated and is brought into the standby state. The present invention, however, should not be limited to this. If the selected printer is not on standby, another printer on standby may be selected. This reduces the electric power consumed for bringing the printer into the standby state.

In the above described embodiment, it is possible to select the electric power consumption value per unit time during waiting period from a plurality of values for the digital copying machines 121, 122 and the laser beam printer 123, and the printer server 133 can select the electric power consumption value from the plurality of values and set the same. Instead of selecting the electric power consumption value, however, it is possible to select a temperature value to which the temperature of the heating member such as the fixing device is to be controlled during the waiting period, from a plurality of values.

In the above embodiment, when the printer server 133 receives the job of the image data through the LAN 111, it determines whether the image output apparatus that is selected according to the size of the received job is on standby or not. Alternatively, whether the image output apparatus is on standby or not may be determined in predetermined timing. Further, the determination may be based on the temperature of the atmosphere and/or the temperature of the heating member. The determination may also be based on an elapsed time from the completion of the job relating to the last image data, or how much or whether energy is saved for the heating member. The determination may also be based on a combination of these factors.

In the above embodiment, the printer server 133 selects one of the digital copying machines 121, 122 and the laser beam printer 123. It is also possible to select the image output apparatus designated by the user in preference to others.

The present invention may be accomplished by supplying a program to the system or the apparatus. In this case, the effects of the present invention can be achieved by storing a program represented by a software for achieving the present invention in a storage medium and reading the program into the system or the apparatus.

Figure 10:
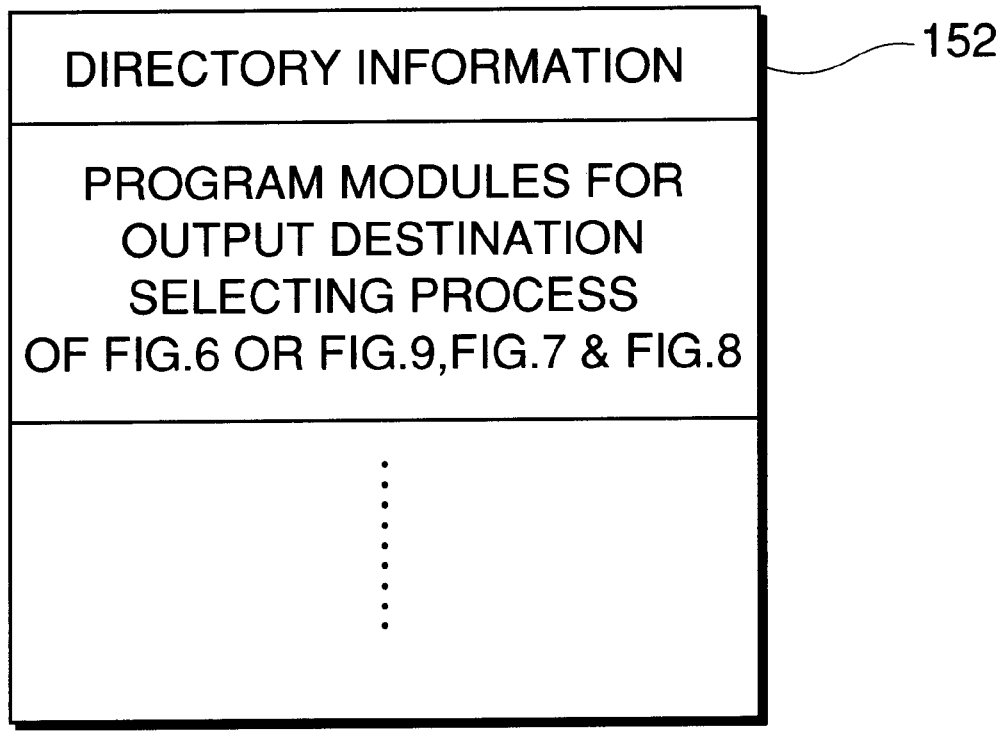
FIG. 10 is a view showing a memory map of ROM as a storage medium.

FIG. 10 shows a memory map of the ROM 152 of the printer server 133 as the storage medium. Printing processing program modules indicated by the flow charts of FIG. 6 or 9, and FIGS. 7 and 8 are stored in the ROM 152. The storage medium for supplying the program modules is not limited to the ROM. It is possible to use as the storage medium a floppy disk, a hard disk, an optical disk, a magneto-optical disk, a CD-ROM, a CD-R, a DVD, a magnetic tape, a non-volatile memory card, and the like.

The functions of the above described embodiment may be realized by the following process. A program code read from the storage medium is written into a memory provided in a capability expansion board or a capability expansion unit connected to the computer, and a CPU or the like provided in the capability expansion board or the capability expansion unit executes a part or the whole of the actual operations according to instructions of the program code to realize the functions of the above described embodiment.

In this case, the program code itself read from the storage medium accomplishes the novel functions of the present invention, and thus the storage medium storing the program code constitutes the present invention.

The functions of the illustrated embodiment may be accomplished not only by executing the program code read by a computer, but also by causing an operating system (OS) on the computer, to perform a part or the whole of the actual operations according to instructions of the program code.

In the above described embodiment, electrophotographic image output apparatuses are connected to the printer server, but the present invention is not limited to this. For example, other types of image output apparatuses such as an ink-jet printer and a thermal printer may be connected to the printer server.

As described above, according to the present invention, the image output apparatus with the smallest electric power consumption is selected according to the size of the job received by the information processing apparatus. This decreases the electric power consumption of the entire system, and makes it possible to properly control the electric power consumption of plural image output apparatuses connected to the network.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An information processing apparatus comprising:
   receiving means for receiving image data;
   sensing means for sensing a state of a plurality of image output apparatuses; and
   selecting means for selecting from the plurality of image output apparatuses an image output apparatus that is to output the image data received by said receiving means according to the state of said plurality of image output apparatuses sensed by said sensing means such that an electric power consumption for outputting images can be minimum.

2. An information processing apparatus as defined in claim 1, wherein:
   said selecting means selects said image output apparatus according to a size of a job based on said image data received by said receiving means and the state of said plurality of image output apparatuses sensed by said sensing means.

3. An image processing apparatus as defined in claim 2, wherein:
   said selecting means selects said image output apparatus that has a suitable electric power consumption for the size of said job.

4. An information processing method comprising:
   a receiving step of receiving image data;
   a sensing step of sensing a state of a plurality of image output apparatuses;
   a selecting step of selecting from said plurality of image output apparatuses an image output apparatus that is to output the image data received in said receiving step according to the state of said plurality of image output apparatuses sensed in said sensing step such that an electric power consumption for outputting images can be minimum.

5. An image processing method as defined in claim 4, wherein said selecting step comprises:
   selecting said image output apparatus according to a size of a job based on said image data received in said receiving step and the state of said plurality of image output apparatuses sensed in said sensing step.

6. An image processing method as defined in claim 5, wherein said selecting step comprises:
   selecting said image output apparatus that has a suitable electric power consumption for the size of said job.

7. A storage medium which stores a program for controlling an image processing apparatus to receive image data and selectively supply the received image data to one of a plurality of image output apparatuses, wherein said program includes:
   a receiving module for receiving the image data;
   a sensing module for sensing a state of said plurality of image output apparatuses; and
   a selecting module for selecting from said plurality of image output apparatuses an image output apparatus that is to output the image data received by said receiving module according to the state of said plurality of image output apparatuses sensed by said sensing module such that an electric power consumption for outputting images can be minimum.

8. A storage medium as defined in claim 7, wherein:
   said selecting module selects said image output apparatus according to a size of a job based on said image data received by said receiving module and the state of said plurality of image output apparatuses sensed by said sensing module.

9. A storage medium as defined in claim 8, wherein:
   said selecting module selects said image output apparatus that has a suitable electric power consumption for the size of said job.

10. An image output system in which a plurality of image output apparatuses are connected to an information processing apparatus, wherein said information processing apparatus comprises:
    state sensing means for sensing a state of said plurality of image output apparatuses; and
    wherein said image output system controls operation of said plurality of image output apparatuses in such a manner as to reduce an electric power consumption of said image output system as a whole according to the sensed state of said image output apparatuses.

11. An image output system as defined in claim 10, further comprising:

an image processing apparatus for transmitting image data to said information processing apparatus; and wherein said information processing apparatus has selecting means for selecting from said plurality of image output apparatuses an image output apparatus that is to output the image data transmitted by said image processing apparatus according to a size of a job based on the image data and the state of said plurality of image output apparatuses sensed by said state sensing means such that an electric power consumption for outputting images can be minimum.

12. An image output system as defined in claim 11, wherein:

said selecting means selects said image output apparatus that has a suitable electric power consumption for the size of said job based on the image data transmitted by said image processing apparatus; and wherein said image output system activates the selected image output apparatus into a standby state when it is determined that the selected image output apparatus is not in the standby state, according to the state thereof sensed by said state sensing means.

13. An image output system as defined in claim 11, wherein:

said selecting means selects said image output apparatus that has a suitable electric power consumption for the size of said job based on the image data transmitted by said image processing apparatus; and wherein said image output system switches the selected image output system to another image output system when it is determined that the selected image output apparatus cannot be used, according to the state thereof sensed by said state sensing means.

14. An image output system as defined in claim 11, wherein said information processing apparatus is capable of selecting and setting an electric power consumption value of each of said plurality of image output apparatuses per unit time during a waiting period from a plurality of values.

15. An image output system as defined in claim 11, wherein said plurality of image output apparatuses each have a heating member, and said information processing apparatus is capable of selecting and setting a temperature of each of said plurality of image output apparatuses to which a temperature of said heating member is to be controlled, from a plurality of values.

16. An image output system as defined in claim 12, wherein said state sensing means senses the state of the image output apparatus selected according to the size of said job.

17. An image output system as defined in claim 11, wherein said state sensing means senses the state of said plurality of image output apparatuses in predetermined timing.

18. An image output system as defined in claim 11, wherein said state sensing means senses the state of said plurality of image output apparatuses based on an atmospheric temperature thereof.

19. An image output system as defined in claim 11, wherein said plurality of image output apparatuses each have a heating member, and said state sensing means senses the state of each of said plurality of image output apparatuses based on a temperature of the heating member thereof.

20. An image output system as defined in claim 11, wherein said state sensing means senses the state of each of said plurality of image output apparatuses based on elapsed time from a completion of a last job of each of said plurality of image output apparatuses.

21. An image output system as defined in claim 11, wherein said plurality of image output apparatuses each have a heating member, and said state sensing means senses the state of each of said plurality of image output apparatuses based on how much or whether energy is saved for the heating member thereof.

22. An image output system as defined in claim 11, wherein said selecting means selects the image output apparatus designated by a user in preference.

23. A method of controlling an electric power consumption of an image output system, which transmits image data from an image processing apparatus to an information processing apparatus, and outputs the transmitted image data from one of plural image output apparatuses connected to said information processing apparatus, said method comprising the steps of:

selecting from said plurality of image output apparatuses an image output apparatus that has a suitable electric power consumption for a size of a job based on the image data transmitted from said image processing apparatus;

sensing a state of the selected image output apparatus; and activating the selected image output apparatus into a standby state when it is determined that the selected image output apparatus is not in the standby state, according to the sensed state of the selected image output apparatus, and switching the selected image output apparatus to another image output apparatus when it is determined that the selected image output apparatus cannot be used, according to the sensed state of the selected image output apparatus.

24. A storage medium which stores a program for transmitting image data from an image processing apparatus to an information processing apparatus, and causing the transmitted image data to be outputted from one of a plurality of image output apparatuses connected to said information processing apparatus, said program being executed by a CPU in said information processing apparatus, wherein said program comprises:

a module for selecting from said plurality of image output apparatuses an image output apparatus that has a suitable electric power consumption suitable for a size of of a job based on the image data transmitted from said image processing apparatus;

a module for sensing a state of the selected image output apparatus; and a module for activating the selected image output apparatus into a standby state when it is determined that the selected image output apparatus is not in the standby state, according to the sensed state of the selected image output apparatus, and switching the selected image output apparatus to another image output apparatus when it is determined that the selected image output apparatus cannot be used, according to the sensed state of the selected image output apparatus.

* * * * *